(12) United States Patent
Feldman et al.

(10) Patent No.: US 6,567,477 B1
(45) Date of Patent: May 20, 2003

(54) TWO-DIMENSIONAL CONSTELLATION GENERATION, PRUNING, AND PARTIAL GRAY CODING FOR BANDWIDTH AND POWER EFFICIENCY

(75) Inventors: David D. Feldman, L.A., CA (US); Frank Chethik, Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 08/959,811

(22) Filed: Mar. 14, 2000

(51) Int. Cl.$^7$ .............................................. H04L 27/36
(52) U.S. Cl. ........................ 375/295; 332/103; 375/298
(58) Field of Search ................................ 375/295, 298, 375/312, 261, 262, 264, 265, 279, 280, 281, 308; 332/103; 714/781, 786, 792, 795

(56) References Cited

U.S. PATENT DOCUMENTS

| | | | | |
|---|---|---|---|---|
| 5,612,651 A | * | 3/1997 | Chethik | ...................... 332/103 |
| 5,815,531 A | * | 9/1998 | Dent | ........................... 375/298 |
| 5,867,071 A | * | 2/1999 | Chethik | ...................... 332/103 |
| 5,917,384 A | * | 6/1999 | Chethik et al. | ............. 332/103 |
| 6,195,396 B1 | * | 2/2001 | Fang et al. | .................. 375/261 |

* cited by examiner

Primary Examiner—Don N. Vo
Assistant Examiner—Dung X. Nguyen
(74) Attorney, Agent, or Firm—Kenneth W. Float

(57) ABSTRACT

An improved constellation pruning and partial Gray coding method for generating constellations that are transmitted by a transmitter. The approximate symbol error rate (SER) for each possible subconstellation is first determined. Then, each of the subconstellations are scaled in terms of power so that each subconstellation has the same symbol error rate. Then, the subconstellation that requires the least amount of power to generate is selected as the pruned constellation for use by the transmitter. After the pruned constellation is determined, it is then coded a single time, and this coded pruned constellation is used by the transmitter.

15 Claims, 13 Drawing Sheets

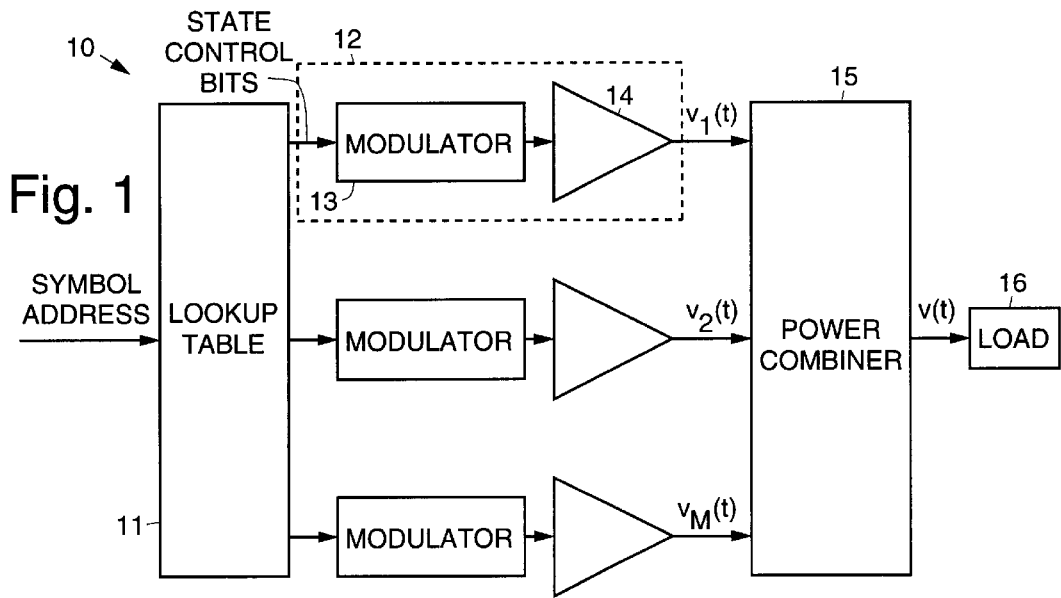
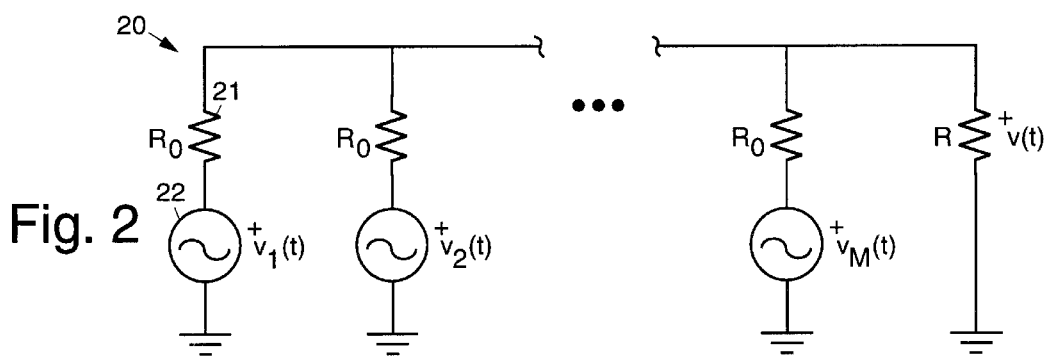

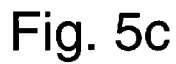
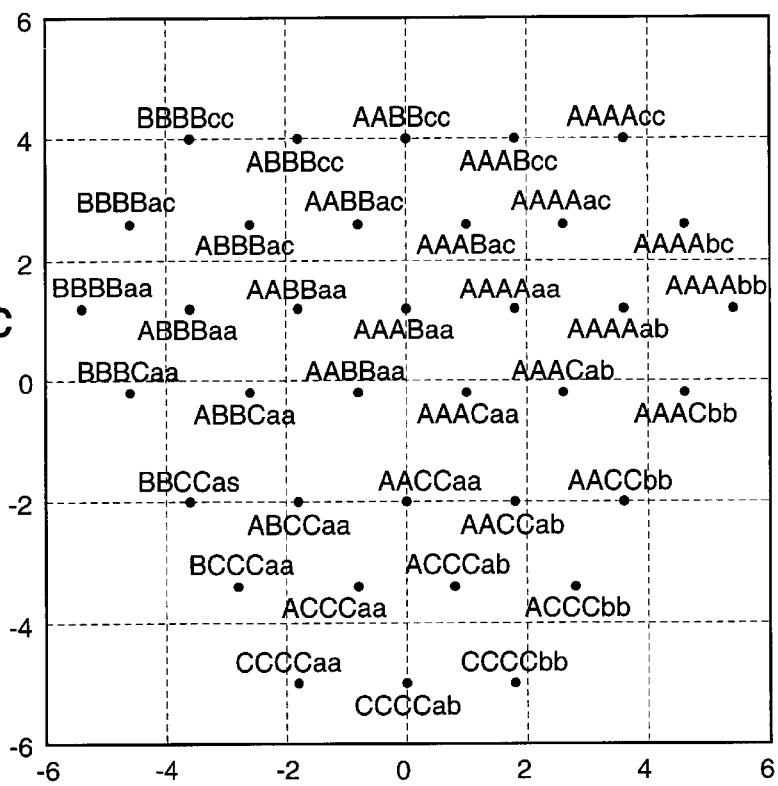
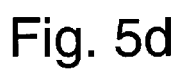
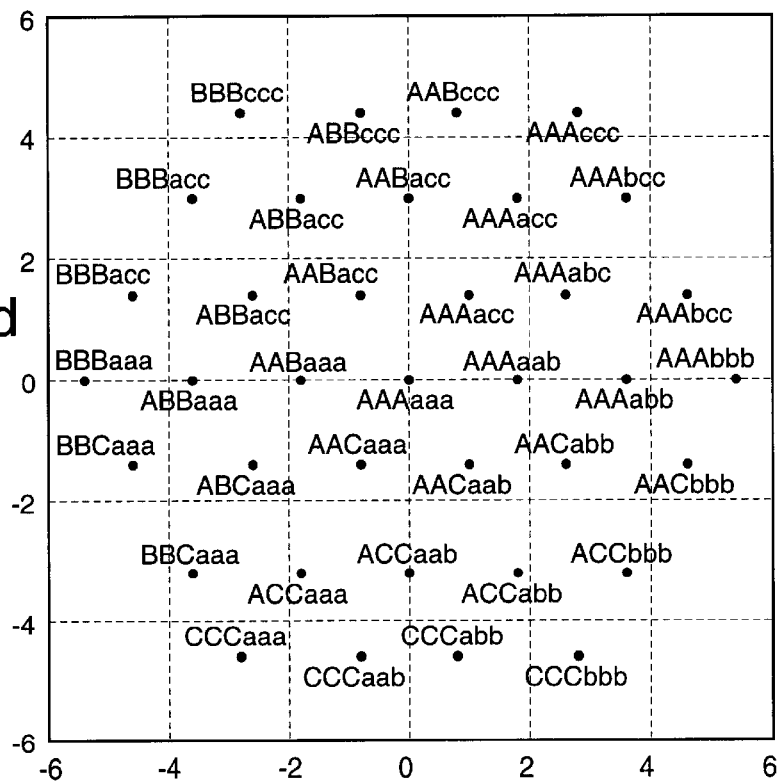

BER/SER = 1.3/6

| SEQUENCE | AVERAGE HAMMING DISTANCE |
|---|---|
| 0010 | 2.5 |
| 0100 | 1.5 |
| 0110 | 1.5 |

TWO-DIMENSIONAL CONSTELLATION GENERATION, PRUNING, AND PARTIAL GRAY CODING FOR BANDWIDTH AND POWER EFFICIENCY

BACKGROUND

The present invention relates generally to communication apparatus, and more particularly, to methods that provide for constellation pruning and partial Gray coding of the pruned constellation that may be used with a transmitter hardware architecture that implements two-dimensional, uncoded signaling for equiprobable signals suitable for multiple gigabit/second satellite communications.

At gigabit/second and higher data rates, hardware limitations can prevent implementation of relatively complex satellite communication schemes with features such as coded modulation, shaping codes, multi-dimensional constellations, and non-equiprobable signaling. The present invention addresses simpler and more easily realized communication scheme using two-dimensional, uncoded modulation with equiprobable signals.

Previous work on two-dimensional constellation design has generally not associated the constellation with a particular hardware architecture. Such work has therefore tended to emphasize power measures related to the transmitter output (RF) power, such as the ratio at the receiver of the bit energy to the noise power density, $E_b/N_0$. However, the transmitter prime power is a more useful criterion because it directly corresponds to the energy drain on the satellite's batteries. Unless the constellation design is assumed fixed, the transmitter prime power and the output power are not linearly related because the efficiency with which the transmitter converts the former to the latter depends on the particular constellation employed.

Constellation design methods are discussed in articles by: R. W. Lucky et al. entitled "On the optimum performance of N-ary systems having two degrees of freedom", IRE Transactions on Communications Systems, 10:185–192. June 1962; S. Moskowitz, entitled "Signal design for coherent M-ary communication systems using stochastic gradients. In Proceedings of the 5th Hawaii International Conference on System Science, pages 171–173, Honolulu. Hi., January 1972; G. J. Foschini, et al. entitled Optimization of two-dimensional signal constellations in the presence of Gaussian noise", IREE Trans. on Communications COM-22:28–38. January 1974; and S. Emami et al. entitled "Signal selection for non-symmetric sources in two dimensions", in Southeastcon, pages 461–464, Birmingham, Ala. April 1992.

The constellation design methods discussed in articles attempt to minimize the probability of symbol error while constraining the average or peak value of $E_b/N_0$, usually by following an approximate gradient descent and renormalizing the symbol locations after each gradient update step in order to satisfy the power constraint. These methods are not applicable in the current context, because the hardware architecture restricts the symbols to a set of discrete locations that cannot be continuously adjusted, but only allowed or disallowed. In an article by J. Salz, et al. entitled "Data transmission by combined AM and PM", in The Bell System Technical Journal, 50(7):7399–2419, September 1971, the symbol space was assumed to be quantized to $N_a$ equally spaced amplitude levels and $N_p$ equally spaced phases per amplitude level. The corresponding constellations, dense near the origin and increasingly sparse away from it, radically differ from those discussed herein. Furthermore, the topic of pruning was not discussed in the Salz, et al. article, as K was always assumed to equal $N_aN_p$, where K is the number of constellation symbols.

Coding for certain non-rectangular constellations was examined in an article by T. Yamazato, et al. entitled "An arrangement technique of Gray-code table for signal constellation of modified QAM and triangular-shaped signal set", in IEICE Transactions, E 74(9): 2579–2585, September 1991. In that work, a one-to-one correspondence between the symbols of a rectangular, Gray-coded constellation and a non-rectangular constellation was established by "manually" warping and transferring the symbols to lie on top of each other. Although this unsystematic technique may sometimes provide a good initial coding that can then be improved by the "swapping" coding algorithm developed herein, the technique seems ill-suited to irregularly shaped constellations.

In the above cited Foschini, et al. article, it was shown that under a constraint on the average value of $E_b/N_0$, the hexagonal or "honeycomb" constellation is asymptotically optimal as the number of symbols goes to infinity. In a hexagonal constellation, the symbols are located at the centers of densely packed hexagons. For various finite constellation sizes, the superiority of the hexagonal constellation over other standard constellations (e.g., circular, cross, octagonal, pentagonal, rectangular, and triangular constellations) has also been demonstrated as discussed in articles by: K. Kawai, et al., entitled "Optimum combination of amplitude and phase modulation scheme and its application to data transmission modem", in Proceedings of IEEE International conference on communications, pages 29.6–29.11, Phil., Pa., June 1972; M. K. Simon et al. entitled "Hexagonal multiple phase-and-amplitude-shift-keyed signal sets", in IEEE Trans. on Communications, COM-71:1108–1115, October 1973; and G. D. Forney, Jr., et al., entitled "Efficient modulation for band-limited channels. IEEE Trans. on Selected Areas in Communications, 2(5): 632–647, September 1984.

Accordingly, it is an objective of the present invention to provide for constellation pruning and partial Gray coding methods for use with a transmitter hardware architecture that implements multiple gigabit/second satellite communications.

SUMMARY OF THE INVENTION

To meet the above and other objectives, the present invention provides for improved constellation pruning and partial Gray coding methods. Such methods may be employed with a transmitter hardware architecture that implements multiple gigabit/second satellite communications. The transmitter hardware, which implements two-dimensional, uncoded signaling for equiprobable signals, comprises an array of interchangeable transmitter stages. Each stage of the transmitter includes a constant-signal phase shift keying (PSK) modulator and can generate multiple phase states. By way of example, stages with four or six states produce rectangular QAM or hexagonal constellations of symbols, respectively.

A more complex variant of the transmitter design also implements on-off keying, wherein any stage may be keyed into an additional "off" state, providing increased power efficiency. In the off state, the supply current to the power amplifier of a stage is interrupted and the power consumed by the stage is essentially zero. When several stages destructively interfere with each other, they are keyed into their off states to save power without altering the output of the transmitter.

Using this transmitter architecture, hexagonal constellations, for example, are produced when the transmitter stages have six phase states, and QAM (quadrature amplitude modulation or rectangular) constellations when there are four phase states.

Designing the transmitter requires determining the number of phase states per stage, the number of stages, whether to enable on-off keying, and which symbols to "prune" from excessively large constellations. Two design optimization criteria used in implementing the present invention are the transmitter prime power and the bit error rate. Although the transmitter output power is a more conventional criterion, the transmitter prime power is preferable because it directly relates to the amount of power consumed by the transmitter.

For binary communications, the pruned constellation is coded by assigning binary sequences to its symbols. Computationally efficient strategies for pruning and coding, provided by the present invention, yield coded hexagonal constellations, for example, that outperform traditional Gray-coded QAM constellations. In some cases, judicious selection of the design parameters can reduce the transmitter prime power by over 3 dB.

Signals generated using the transmitter correspond to symbols located in a two-dimensional space. The set of possible symbols, each of which is specified by its amplitude and phase or by its real and imaginary components, is termed the constellation. If it is desired that the transmitted symbol (signal) convey K bits of information, the constellation has size $2^K$, as the symbols can then be "coded" or put into one-to-one correspondence with the set of binary sequences of length K. In general, the constellation size is larger than necessary, and some of the symbols must be disallowed or "pruned" from the constellation. Two performance measures are particularly important when optimizing the constellation design: the transmitter prime power (the power consumed by the transmitter), and the bit error rate when the received symbols are corrupted by Gaussian noise. Computationally efficient pruning and coding strategies based on these measures are provided by the present invention.

In particular, the present invention provides for a method of pruning and coding constellation transmitted by the transmitter. Pruning comprises the following steps. The approximate symbol error rate (SER) for each possible subconstellation is determined. Then, each of the subconstellations are scaled in terms of power so that each subconstellation has the same symbol error rate. Then, the subconstellation that requires the least amount of power to generate is chosen as the pruned constellation for use by the transmitter. After the pruned constellation is determined, it is then coded a single time, and this coded pruned constellation is used by the transmitter.

In coding the selected pruned constellation, (a) sequences to constellation symbols are randomly assigned. (b) A bit error rate for the constellation is then computed taking into account only nearest neighbor errors. (c) A predetermined number of constellation sequences are then switched. (d) A new bit error rate for the constellation is computed taking into account only nearest neighbor errors. (e) If the new bit error rate is reduced from the previous one, then the new mapping of sequences to symbols is retained; Otherwise the mapping prior to the switch is retained. (f) All possible switches are tested and whenever a switch is accepted, then testing begins again. All possible switches are tested until no switches are made. The predetermined number of constellation sequences that are simuntaneously switched may be two, three four, five, etc.

Alternatively, coding the selected pruned constellation may be accomplished by (a) selecting a point of an uncoded constellation. (b) The nearest neighbors of the selected point is found. (c) All possible sequences that can be used are evaluated, and an unused sequence from the available sequences that produces the best bit error rate is selected. (d) The remainder of the unused sequences is recorded. (e) The next nearest neighbors of the selected point are coded. (f) Steps (a) through (e) for each remaining point of the constellation are repeated.(g) If it is determined that the bit error rate is exceeded, indicating that a poor selection was made in step (c), the most recent decision is rejected and steps (c) through (e) are repeated until a code is selected that produces an acceptable bit error rate. (h) If it is determined in step (g) that none of the unused sequences produces an acceptable bit error rate, the next prior decision is rejected and steps (c) through (e) are repeated until a code is selected that produces an acceptable bit error rate. (i) Steps (a) through (h) are repeated for each remaining point of the constellation.

BRIEF DESCRIPTION OF THE DRAWINGS

The various features and advantages of the present invention may be more readily understood with reference to the following detailed description taken in conjunction with the accompanying drawing figures, wherein like reference numerals designate like structural elements, and in which:

FIG. 1 illustrates a hardware architecture of a modulating array transmitter that may use constellation pruning and partial Gray coding methods in accordance with the principles of the present invention;

FIG. 2 illustrates an equivalent circuit diagram of the transmitter of FIG. 1;

FIG. 5c illustrates a 36 symbol UUUUDD constellation;

FIG. 5d illustrates a 37 symbol UUUDDD constellation;

FIG. 9b illustrates coding for the 64 HEX qMAX constellation of FIG. 9a;

FIG. 10 illustrates tree-structured coding of the 16 HEX qMAX constellation of FIG. 7a.

DETAILED DESCRIPTION

Figure 3A:
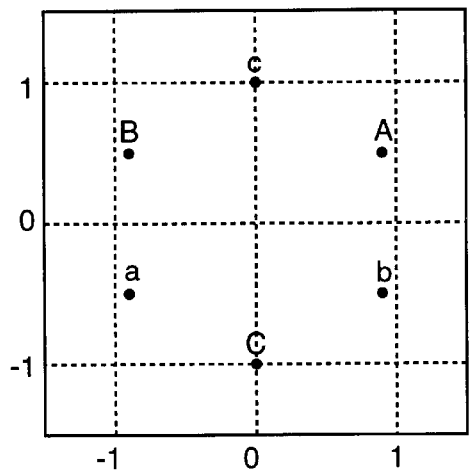
FIGS. 3a and 3b illustrate states of H and Q stages in qMAX and pMAX modes.

Details of the present invention are discussed below, including the architecture of the transmitter and a description of how an unpruned constellation is generated. Constellation performance metrics including transmitter prime power and the bit error rate are defined. A computationally efficient method for pruning a constellation with superfluous symbols, and algorithms for coding pruned symbols of the constellation are disclosed. Performance results for different constellations are discussed.

Referring to the drawing figures, FIG. 1 illustrates a hardware architecture of an exemplary modulating array transmitter 10 that may use methods in accordance with the present invention. FIG. 2 shows an equivalent circuit diagram of the transmitter 10 of FIG. 1. The transmitter 10 comprises a symbol addressed lookup table 11 that receives symbol addresses as input signals. A plurality of signal outputs of the symbol addressed lookup table 11 are coupled to a plurality (array) of parallel transmitter stages 12. Each transmitter stage 12 comprises a constant-signal phase shift keying (PSK) modulator 13 that is coupled to a saturated solid state power amplifier 14 (SSPA). The symbol addressed lookup table 11 outputs state control bits for each of the plurality of modulators 13. The output of each saturated solid state power amplifier 14 comprises a voltage $v_M(t)$ for the respective amplifier 14. Each of the voltage outputs of the respective amplifiers 14 are combined in a power combiner 15 to produce an output voltage of the transmitter 10 which is coupled to a load 16, such as an antenna, for example.

At data rates that fill the bandpass region of each satellite traveling wave tube amplifier, bandwidth efficient communication requires the amplifier to be operated at or near saturation. Unavoidable linear distortion is therefore severely compounded by the inherent nonlinear response of the traveling wave tube amplifier. The resultant constellation "spreading", although mitigated by predistortion, pre-equalization, and equalization, can produce unacceptable error rates unless the constellation complexity is limited to 16-ary waveforms. The transmitter 10 overcomes this limitation by using the array of solid state power amplifiers 14. Compared to traveling wave tube amplifiers, the solid state power amplifiers 14 introduce less linear and nonlinear distortion. The amplifiers 14 in the array are nearly identical, and are built from a common MMIC element design and a common wafer fabrication, and exhibit uniform parasitic phase shift and saturated output power with uniform thermal and aging properties. Each solid state power amplifier 14 is driven by the PSK modulator 13 and for efficiency, is operated at saturation. Together, the modulator 13 and the solid state power amplifier 14 constitute one stage 12 of the modulating array transmitter 10. The version of the modulating array transmitter 10 with PSK-only stages 12 is referred to as "qMAX," and the version whose stages 12 also enable on-off keying is referred to as "pMAX".

Figure 3B:
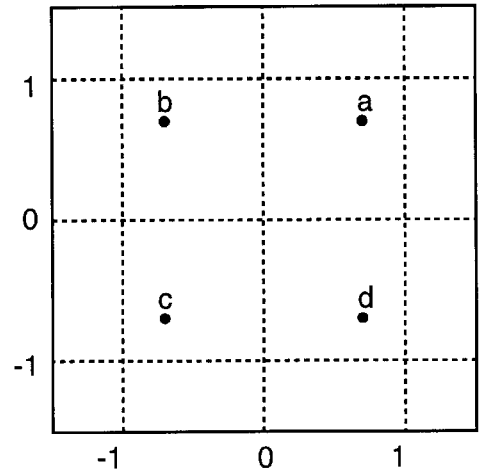

Four different types of modulators 13, including up tri-state (U), down tri-state (D), quad (Q), and hex (H), are described herein. In a qMAX mode (configuration), the U modulator 13 implements 120° PSK where one of the phase states is at −90° in the complex plane. Thus, the U stage 12 can output one of three states, denoted A, B, and C, with the respective values $e^{j\pi/6}$, $e^{j5\pi/6}$, and $e^{-j\pi/2}$. The D stage 12 is the phase inverse of the U stage 12; its states are denoted a, b, and c, with values $-e^{j\pi/6}$, $-e^{j5\pi/6}$, and $e^{j\pi/2}$. The six phase state H stage 12 has $\pi/3$ phase shifts and can output the states of both the U and D modulators 13, and the four phase state Q stage 12 implements $\pi/2$ phase shifts and has states denoted a, b, c, and d. For pMAX mode, all U, D, H, and Q stages 12 have an additional state with amplitude value zero. A stage 12 in the zero state is said to be "turned off." FIGS. 3a and 3b illustrate the states of the H and Q stages 12 in qMAX and pMAX modes.

A symbol is generated by summing some number of transmitter stages 12, M, in parallel using the power combiner 15 that can coherently combine the outputs of the individual stages 12. Control bits that determine the state of each stage 12 may be read from the lookup table 11 whose input is the address of the desired symbol. In FIG. 1, v(t) is the waveform corresponding to the desired symbol. The equivalent circuit diagram of the hardware is shown in FIG. 2. The $m^{th}$ transmitter stage 12 is represented as a Thevenin equivalent network, consisting of a voltage source $v_m(t)$ in series with a resistance $R_0$. With $\alpha$ and $\omega$ respectively denoting the source's amplitude and frequency, $v_m(t)$ can be expressed as $$V_m(t) = \alpha \cos(\omega t + \phi_m), \tag{1}$$

where the complex quantity $e^{j\phi_m}$ is the phase state of the stage 12. In FIG. 2, the array of parallel stages 12 is shown connected to a load 16 having resistance R. Straightforward circuit analysis indicates that the voltage v(t) across the load 16 is given by $$v(t) = (\alpha/(R_0/R+M))(x_n \cos(\omega t) - y_n \sin(\omega t)), \tag{2}$$

where $x_n$ and $y_n$ are the real and imaginary parts of the symbol $S_n$ defined as $$s_n = x_n + j y_n \tag{3}$$

$$= \sum_{m=1}^{M} e^{j\phi_m} \tag{4}$$

The state of the combined stages 12 determines $s_n$; to denote this combined state, the letters corresponding to the states of the individual stages 12 will be concatenated. For example, if there are three U stages 12 and the first stage 12 has state A or $e^{j\pi/6}$, the second has state B or $e^{j5\pi/6}$, and the third is turned off, the combination has state AB or $e^{j\pi/6} + e^{j5\pi/6}$. Once the number of stages 12 and their types are specified, the set of possible symbols, i.e., the constellation, can be determined by simply enumerating all the different combinations of the states of the stages 12.

Because of the additional state, using stages 12 in pMAX mode always results in a (possibly improper) superset of the constellation produced with the same stages 12 in qMAX mode.

Figure 4A:
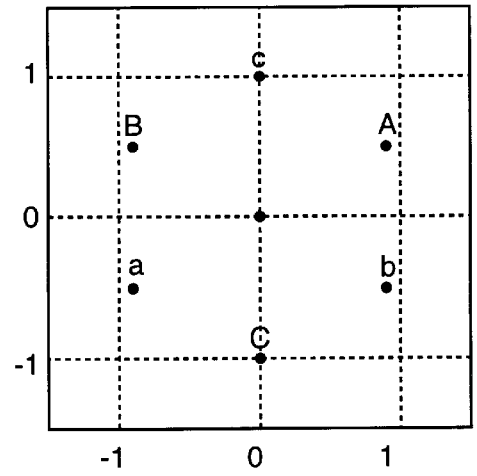
FIG. 4a illustrates a 19 symbol HH qMAX constellation.
Figure 4B:
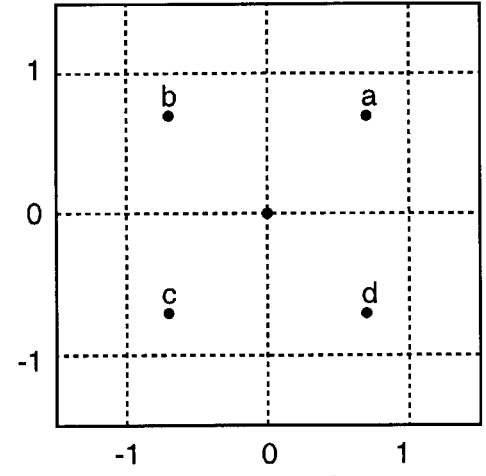
FIG. 4b illustrates a 19 symbol HH pMAX constellation.
Figure 5A:
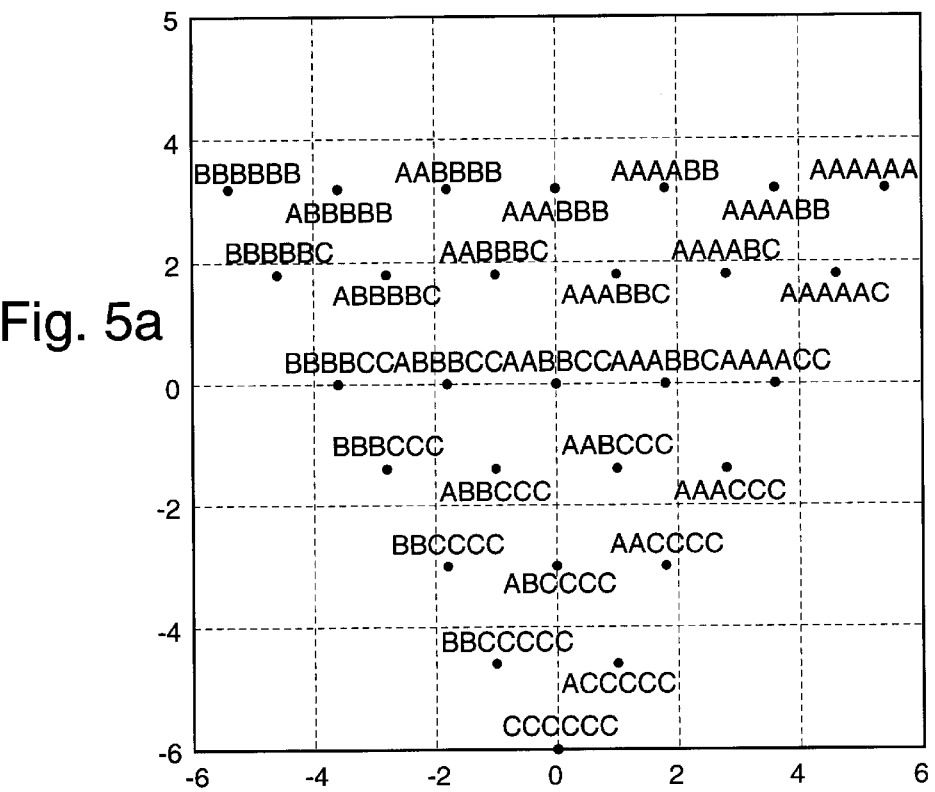
FIG. 5a illustrates a 28 symbol UUUUUU constellation.
Figure 5B:
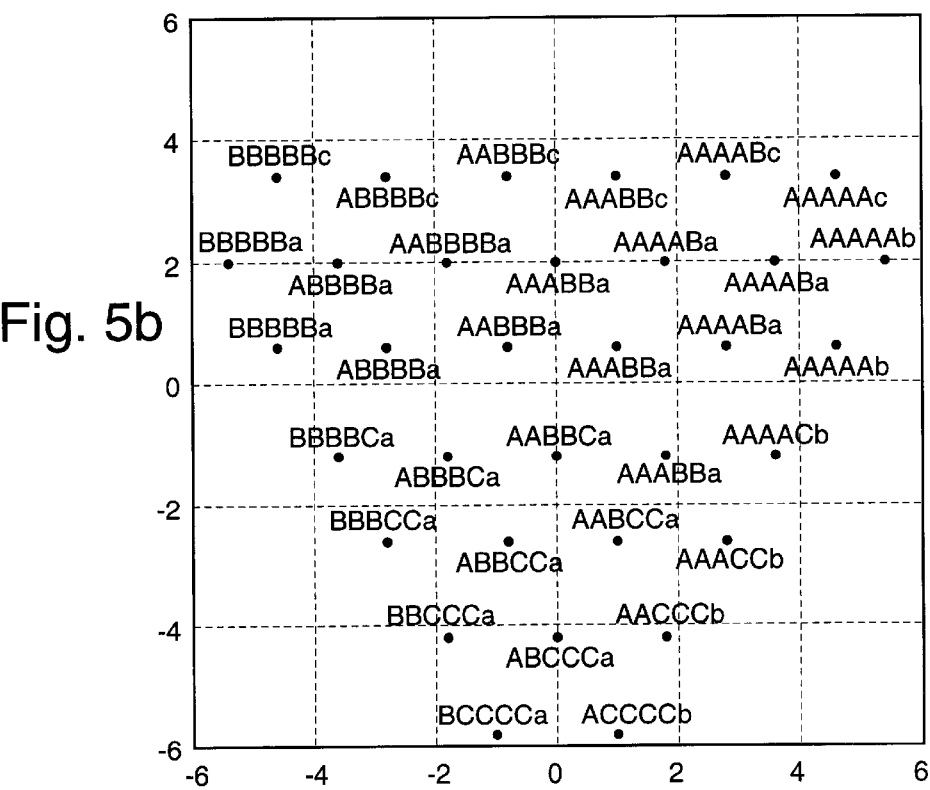
FIG. 5b illustrates a 33 symbol UUUUUD constellation.

A constellation built using two H stages 12 in qMAX mode is shown in FIG. 4a. Although each of the stages 12 has six states, the number of constellation symbols, N, is 19 rather than $6^2=36$ because many state combinations coincide. For example, state AB is identical to state BA, and states Aa, Bb, and Cc are identical. FIG. 4b shows the constellation obtained using two H stages 12 in pMAX mode. The symbols have the same locations as those of the HH qMAX constellation. However, in this and subsequent pMAX constellations, the symbols are assumed to have been generated efficiently, i.e., by turning off the maximum possible number of stages 12.

Generating the innermost symbol of the pMAX constellation requires no stages 12 to be enabled, and that the symbols in the next ring each require only a single stage 12. The fact that the qMAX and pMAX constellations have the same symbol locations holds true regardless of how many H stages 12 are employed, and is a consequence of the property that any hex state (including the zero state) can be expressed as the sum of two other hex states.

FIGS. 5a-5d illustrate constellations generated using six tri-state stages 12 in qMAX mode. As each of the six stages 12 may be either U or D, there would appear to be $2^6$ different constellations. However, because states of the individual stages 12 are simply added together, the ordering of the stages 12 is irrelevant, e.g., state ABCabc is identical to state AaBbCc. Taking rotational symmetry into account further reduces the number of constellations to be considered; for example, the constellation corresponding to four U and two D, or the UUUUDD constellation, is a reflected version of the DDDDUU constellation. In essence, there are only four distinct constellations, namely, the UUUUUU, UUUUUD, UUUUDD, and UUUDDD constellations. Because the set of states of the H stage 12 is a superset of the set of states of the U or D stage 12, a constellation built using H stages 12 is a superset of any constellation built using the same number of tri-state stages 12. For example, the HHHHHH (qMAX or pMAX) constellation has 127 symbols, among which are 37 symbols of the UUUDDD constellation. For binary communications, hypothetically both of these constellations might be pruned to a subconstellation of 32 symbols by simply disallowing certain symbols. However, because the UUUDDD constellation is a small subset of the HHHHHH constellation, the latter can be expected to have a 32-symbol subconstellation that outperforms any 32-symbol subconstellation of the former.

Figure 6A:
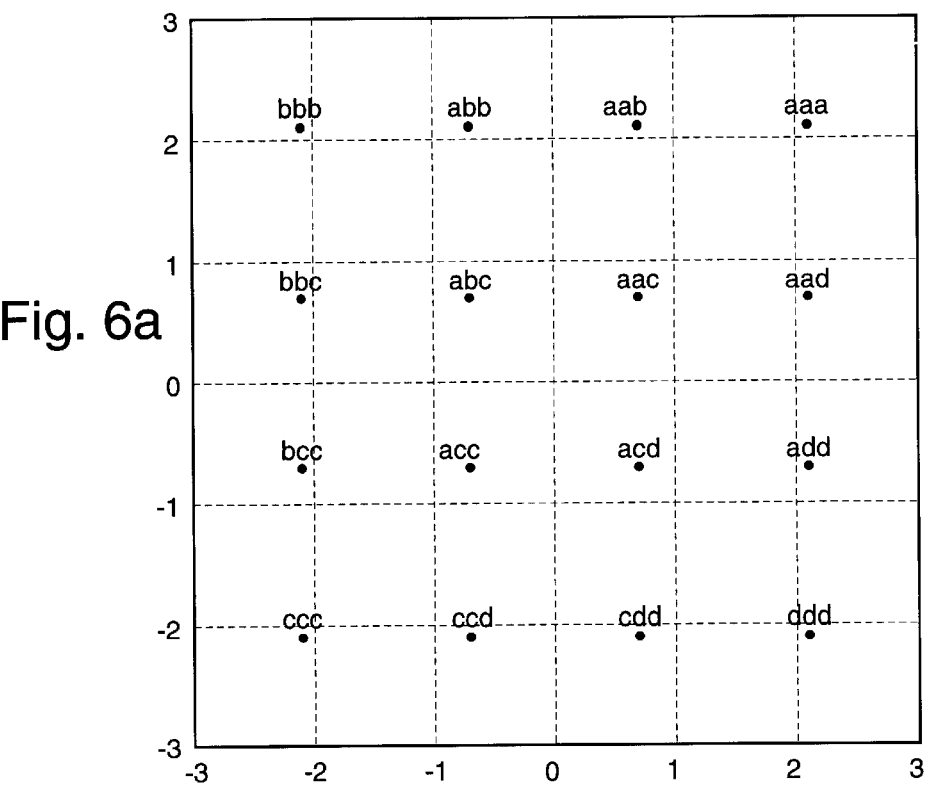
FIG. 6a illustrates a 16 QAM or QQQ qMAX constellation.
Figure 6B:
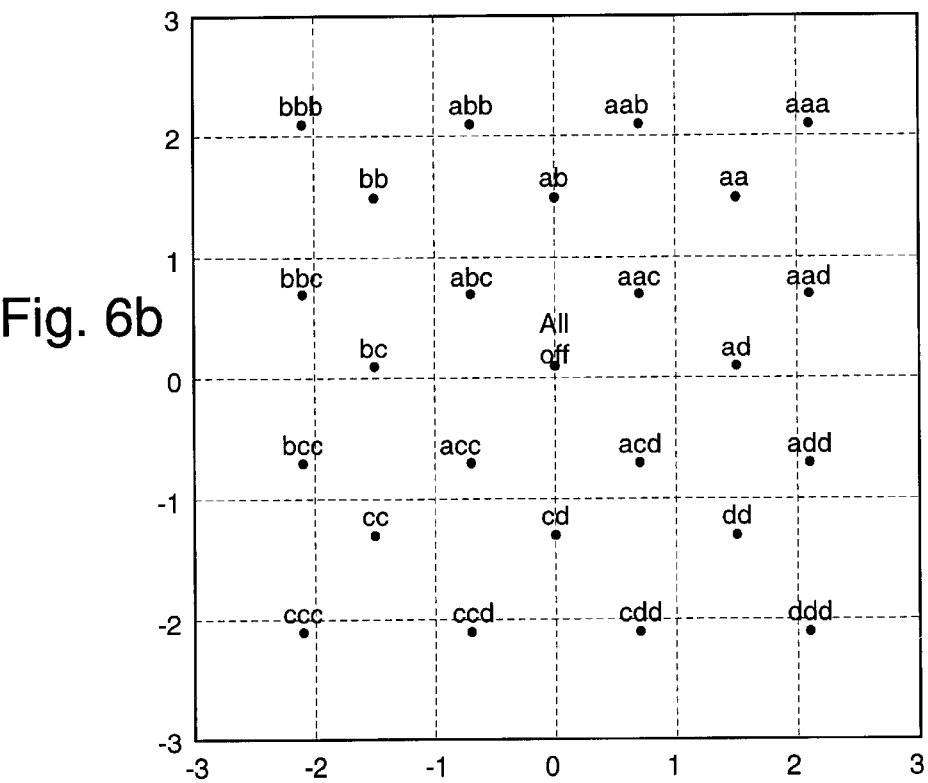
FIG. 6b illustrates a 25 symbol QQQ pMAX constellation.
Figure 6C:
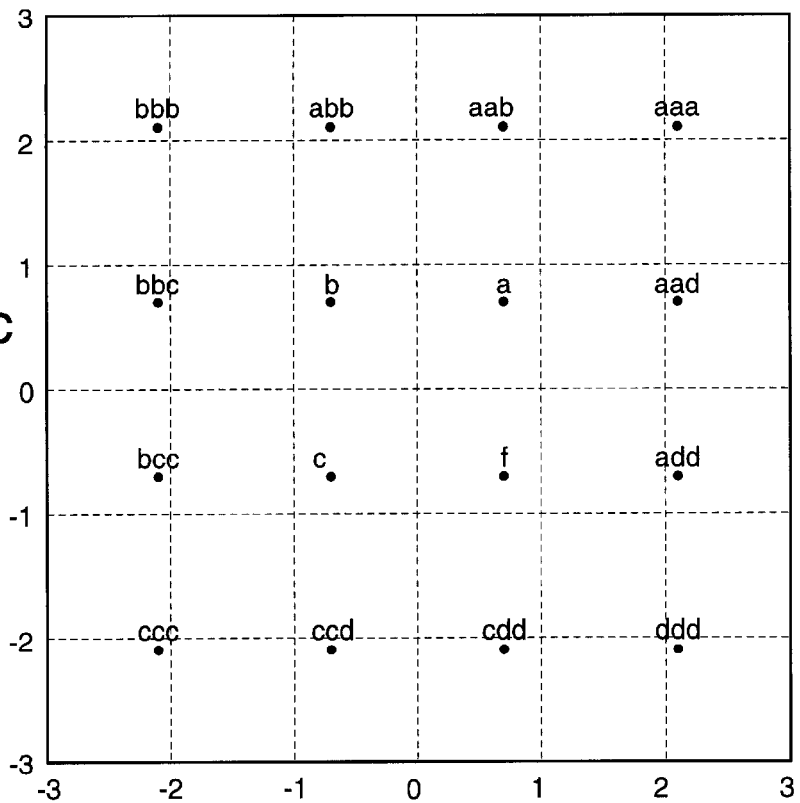
FIG. 6c illustrates a 16 QAM pMAX constellation.
Figure 6D:
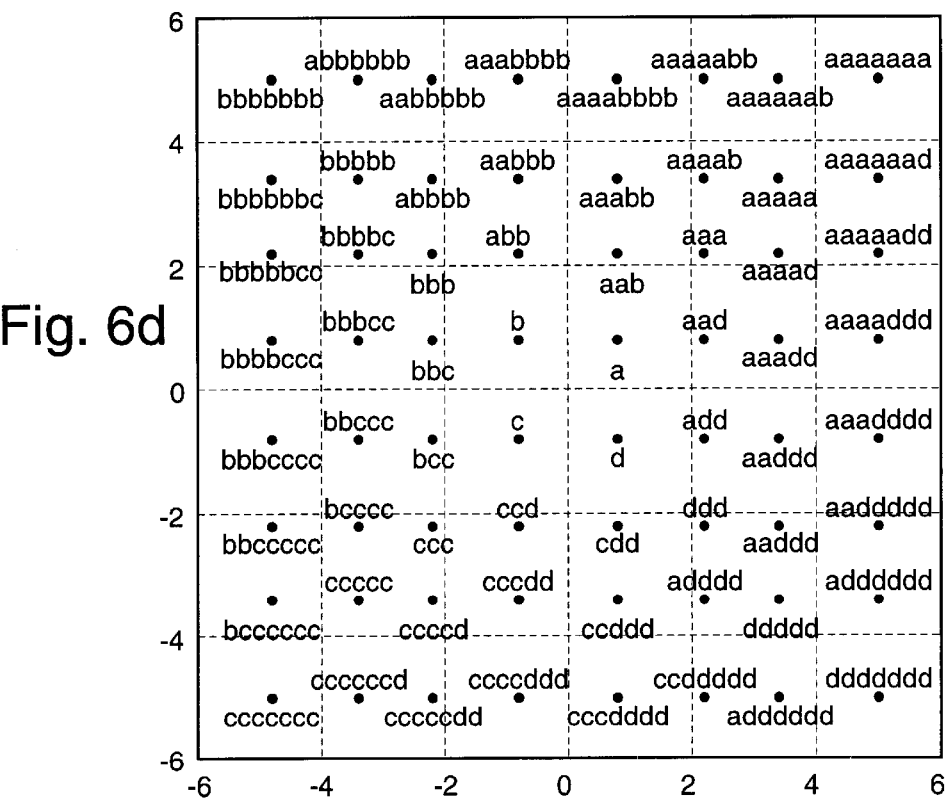
FIG. 6d illustrates a 64 QAM pMAX constellation.

FIGS. 6a and 6b show the QQQ qMAX and pMAX constellations. The former, also referred to as the 16 QAM qMAX constellation, is a proper subset of the latter. In contrast, recall that constellations built with H stages 12 have the same symbols in qMAX and pMAX modes. Efficient, pMAX realizations of the 16 QAM and 64 QAM constellations are shown in FIGS. 6c and 6d.

Performance metrics will now be discussed. The average power consumed by the load 16 (R) over a time interval T is $$\frac{1}{RT}\int_0^T v^2(t)dt \tag{5}$$

If the same symbol $s_n$ is always transmitted, substituting (2) into (5) and taking the limit as T goes to infinity yields the following expression for the load power $P_{load}$:

$$p_{load} = c\|s_n\|_2^2, \tag{6}$$

where $$c=(1/2R)/(\alpha/(R_0/R+M))^2. \tag{7}$$

For a load 16 properly matched to the power combiner 15 of the transmitter 10, $$R=R_0/M, \tag{8}$$

in which case the scale factor c becomes $$c=\alpha^2/8R_0/M. \tag{9}$$

In generating a symbol, the power consumed by the stages 12, $P_{stage}$, equals the power that would be consumed by the load 16 if all the "on" stage states were to add coherently. Consequently, $P_{stage}$ is never smaller than $P_{load}$. Assuming that $r_n$ stages 12 are turned off when the remaining ones add coherently, equation (4) implies that $$\|s_n\|_2 = M - r_n. \tag{10}$$

Substituting this result into equation (6) yields $$P_{stage} = c(M-r_n)^2. \tag{11}$$

Note that in qMAX mode, $r_n$, equals zero for all n.

In comparing constellations, there are several relevant performance metrics. Metrics based on power will first be discuss. One such metric is the average modulation efficiency (AME), defined as the ratio of the average of $P_{load}$ to the average of $P_{stage}$, where these averages are taken over the set of constellation symbols:

$$AME = \frac{\sum_{n=1}^{N} \|s_n\|_2^2}{\sum_{n=1}^{N} (M-r_n)^2}. \tag{12}$$

The values of AME that occur in qMAX and pMAX modes are respectively denoted as $AME_q$ and $AME_p$.

$E_b/N_0$ is defined as the ratio of the average load power per bit to the noise power. With a equal to the standard deviations of the real part and the imaginary part of the additive Gaussian white noise that is assumed to corrupt the received value of the symbol, $E_b/N_0$ can be written as $$E_b/N_0 = \frac{1}{\log(N)} \times \frac{1}{2\sigma^2} \times \frac{c}{N}\sum_{n=1}^{N} \|s_n\|_2^2. \tag{13}$$

In this expression, which is similar to the expression for the signal-to-noise ratio appearing in a book by E. A. Lee et al. entitled "Digital Communication", Kluwer Academic Publishers, 1988, the first factor is identified as the number of symbols per bit, the second factor as the reciprocal of the noise power, and the last factor as the average of $P_{load}$. Because $r_n$ does not appear in equation (13), the value of $E_b/N_0$ does not depend on whether the symbols are generated in qMAX or pMAX mode.

The transmitter prime power (TPP) factor is defined as the ratio of the average of the power per bit to the noise power of the stage 12. From equations (12) and (13), the TPP factor can be expressed as $$TPP = E_b/N_0/AME. \tag{14}$$

The transmitter prime power factor, TPP, is subscripted to indicate whether the value of $AME_q$ or $AME_p$ is used in the calculation. Because the TPP is directly proportional to the amount of power that must be supplied to the transmitter 10, it is the fundamental measure of power; the AME and $E_b/N_0$ metrics are indirectly significant.

Two other metrics, the symbol error rate (SER) and the bit error rate (BER), are of interest. These metrics characterize the transmission quality. The SER equals the probability that the received symbol is decoded as a symbol other than the transmitted one, and is given by $$SER = \frac{1}{N} \sum_{n=1}^{N} \sum_{n'=1}^{N} P_{n,n'}, \quad (15)$$

where $P_{n,n'}$ denotes the probability that the received symbol is mistakenly decoded as $S_{n'}$ given that $S_n$ was transmitted, $P_{n,n}$ is defined as zero, and all N symbols are assumed equally likely to be transmitted. To avoid intensive computation, the SER is often estimated using the union bound discussed in the above-cited Lee et al. book.

This bound relies on the fact that, for a constellation with only two symbols, $s_n$ and $s_{n'}$, $$P_{n,n'} = Q\left(\frac{\|s_n - s_{n'}\|_2}{2\sigma/\sqrt{c}}\right) \quad (16)$$

for $n \neq n'$, and 0 for $n = n'$.

In equation (16), the function Q is the integral of the tail of the Gaussian probability density function. Substituting equation (16) in equation (15) yields an upper bound on the SER.

For communication of binary-valued data, N is typically chosen to be a power of two. When this requirement is imposed, a unique binary sequence $c_n$ consisting of $\log_2(N)$ bits can be assigned to each symbol $s_n$; this operation is termed coding. With $H(c_n, c_n')$ denoting the Hamming distance (the number of bits that differ) between $c_n$ and $c_{n'}$, the BER is given by $$BER = \frac{1}{N \log_2(N)} \sum_{n=1}^{N} \sum_{n'=1}^{N} P_{n,n'} H(c_n, c_{n'}). \quad (17)$$

Using equation (16) in equation (17) yields an upper bound on the BER.

While the BER and not the SER is the fundamental measure of transmission quality, these two metrics are closely related. In coding various constellations built using H or Q stages 12, sufficiently good codes have been found so that $$\frac{1.0}{\log_2(N)} \leq \frac{BER}{SER} < \frac{1.5}{\log_2(N)}. \quad (18)$$

The left-hand side of this equation is a lower bound on the BER/SER.

Constellation pruning will be illustrated using the HH pMAX and qMAX constellations. The methodology discussed below is general, however, and has been applied to all of the candidate constellations discussed herein. Although an additive Gaussian white noise channel has been assumed, other channels such as the Rician or Rayleigh can be accommodated by simply replacing the expression for $P_{n,n'}$ in equation (16) with the appropriate pairwise error probability.

Each of the HH constellations contains 19 symbols, and the requirement that N be a power of two for binary-valued data communications may be satisfied by disallowing any three constellation symbols. The number of different sets of three symbols is 19 CHOOSE 3=969. It is necessary to determine which of the possible 969 prunings is optimal. The pruning approach minimizes the TPP for a given BER.

One possible approach involves coding each of the 969 subconstellations. For each sub-constellation, the source amplitude α is adjusted so that all subconstellations achieve the same specified BER. The best subconstellation is selected as the one with the smallest TPP factor. Unfortunately, finding a good code is very computationally intensive; on a Sun SPARCstation 5, for example, it may take hours to satisfactorily code one constellation. To obviate the need for coding, the pruning approach was modified by specifying the SER rather than the BER. From equation (18), this modified approach and the original approach selects the same or similar subconstellations.

While the TPP factor is proportional to $\alpha^2$, the dependency of the SER on α is more complicated. Finding the value of α that achieves the specified SER necessitates testing different values of α and computing the SER using the union bound for each value. This entire procedure requires minutes of computation time for each subconstellation. To further reduce computational effort, the pruning approach was again modified. The pruning approach used in the present invention adjusts α to achieve a specified value of the TPP factor, then selects the subconstellation with the smallest SER. For qMAX mode, the TPP factor does not depend on which symbols are removed and consequently the requisite value for α is the same for all subconstellations. In experiments conducted by the inventors, the specified value of TPP factor was chosen so that the SER is on the order of 0.001.

Figure 7A:
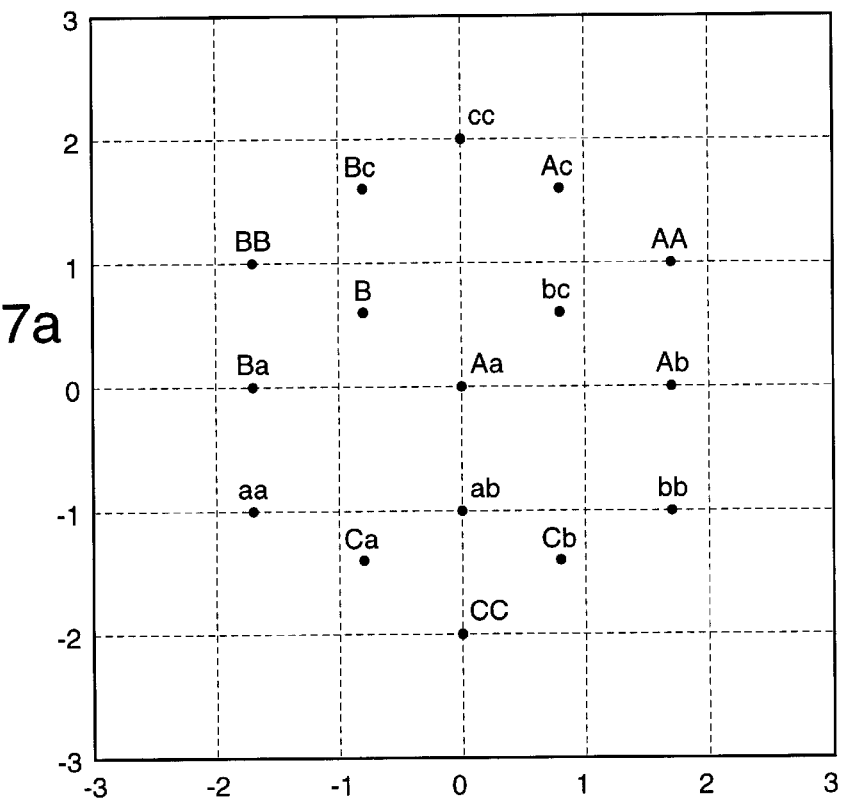
FIG. 7a illustrates a 16 HEX qMAX constellation.

The 16 HEX qMAX constellation whose states are shown in FIG. 7a is the result of applying the (final) pruning approach to the HH qMAX constellation. To understand why this result occurred, the concept of nearest neighbors must be considered. The nearest neighbor of a symbol s is defined as whichever symbol is closest in Euclidean distance to s. Some symbols may have several nearest neighbors; for example, before it was pruned (see FIG. 4a), the symbol with state AB had nearest neighbors with states Aa, bc, Ac, cc, Bc, and ac. When the SER is on the order of 0.001, $P_{n,n'}$ is negligible unless $s_n$ and $s_{n'}$ are nearest neighbors. Also, as the symbols are uniformly spaced, $P_{n,n'}$ is the same for all nearest neighbors. Thus, from equation (15), minimizing the SER is equivalent to minimizing the number of nearest neighbors. Because the outermost symbols have either three or four nearest neighbors, while inner ones have six, removing inner symbols is preferable. Once a gap has been created by removing the first inner symbol, the inner symbols adjacent to that gap only have five nearest neighbors and consequently are not pruned. Thus, symbols remaining after pruning are well-separated.

Figure 7B:
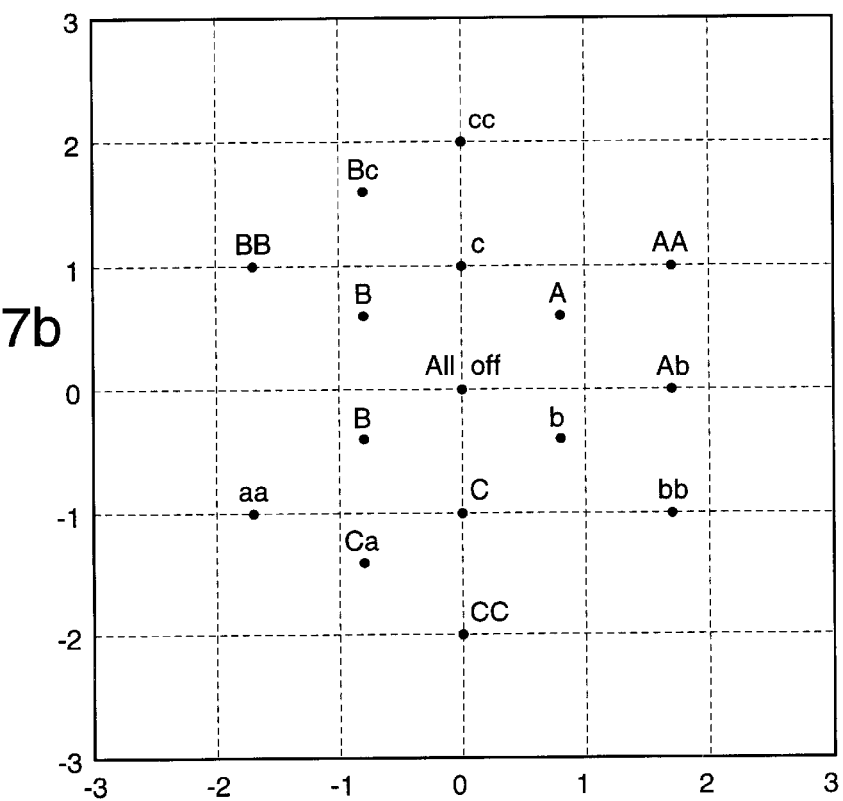
FIG. 7b illustrates a 16 HEX pMAX constellation.

The pruned HH pMAX constellation, referred to as 16 HEX pMAX, is shown in FIG. 7b. Despite the importance of minimizing the number of nearest neighbors, outermost symbols with only four nearest neighbors have been pruned. The reason is that for pMAX, the outermost symbols require four times the power of those located one ring inward. Consequently, when an outermost symbol is removed instead of an inner one, a larger α is needed to achieve the specified TPP factor and c is therefore larger in equation (16). The concomitant reduction in $P_{n,n'}$ for all nearest neighbors $s_n$ and $s_{n'}$ decreases the SER more than the alternative option (i.e., pruning an inner symbol and thus reducing the number of nearest neighbors by six instead of four).

Figure 7C:
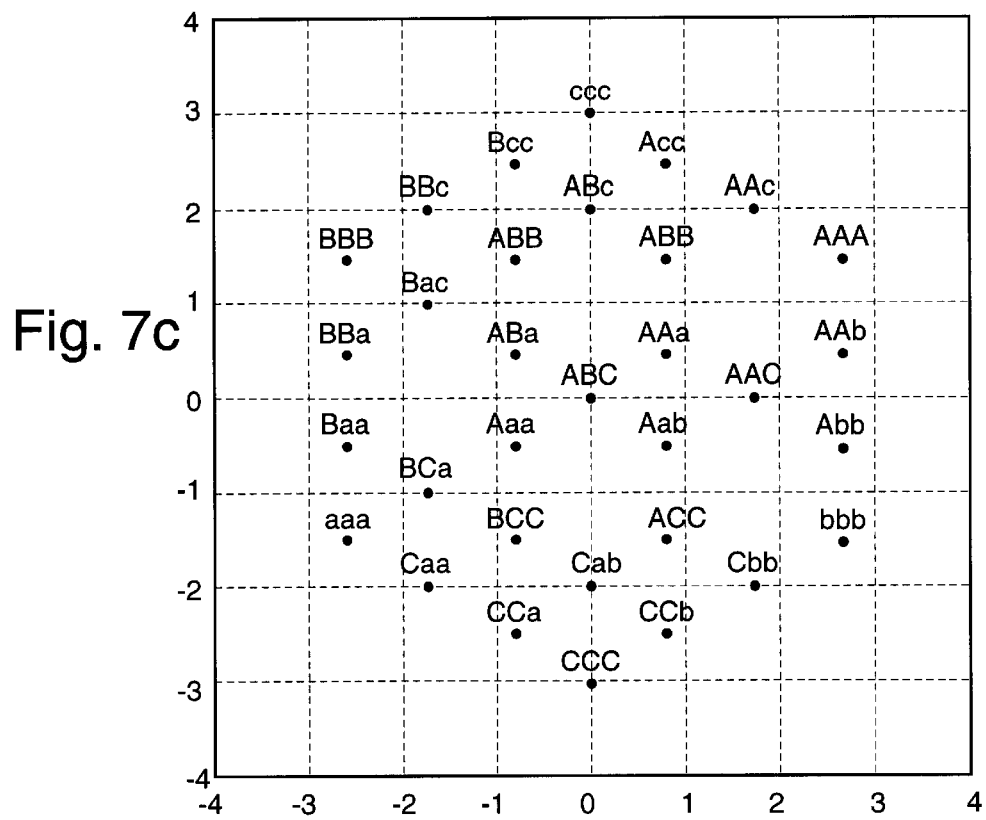
FIG. 7c illustrates a 32 HEX qMAX constellation.
Figure 7D:
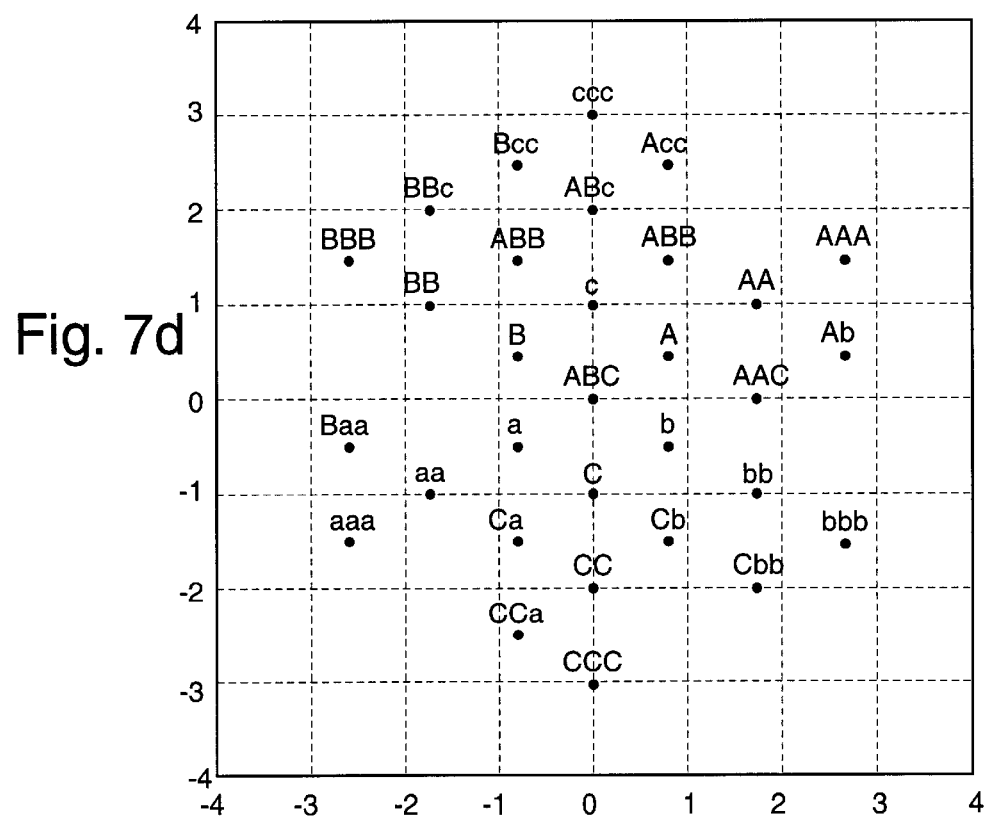
FIG. 7d illustrates a 32 HEX pMAX constellation.
Figure 8A:
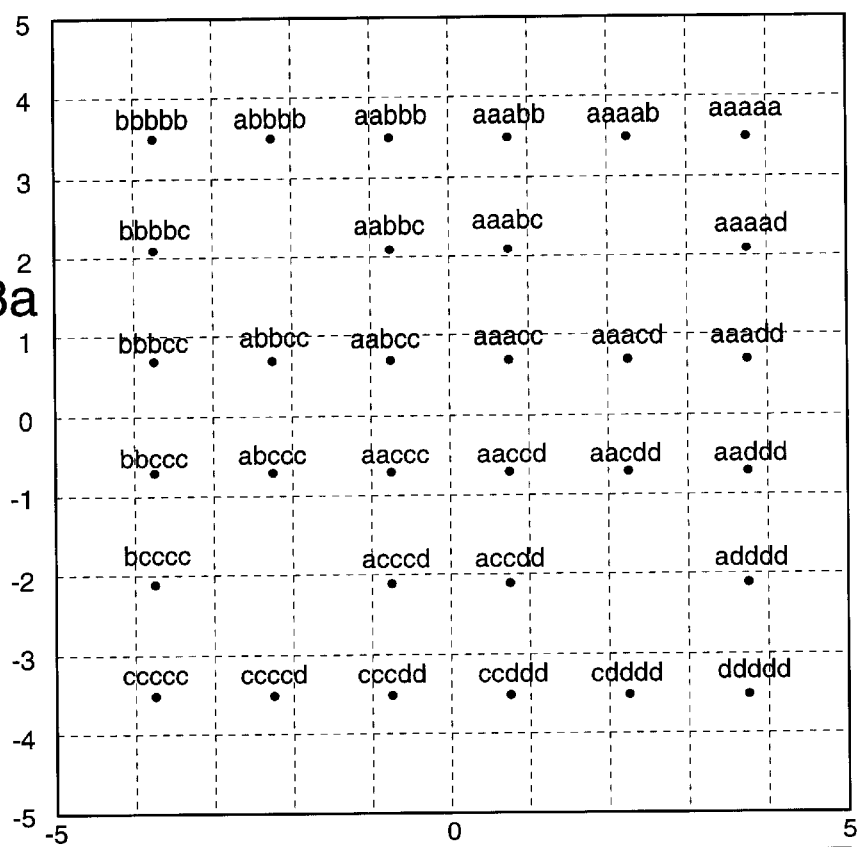
FIG. 8a illustrates a 32 QUAD qMAX constellation.
Figure 8B:
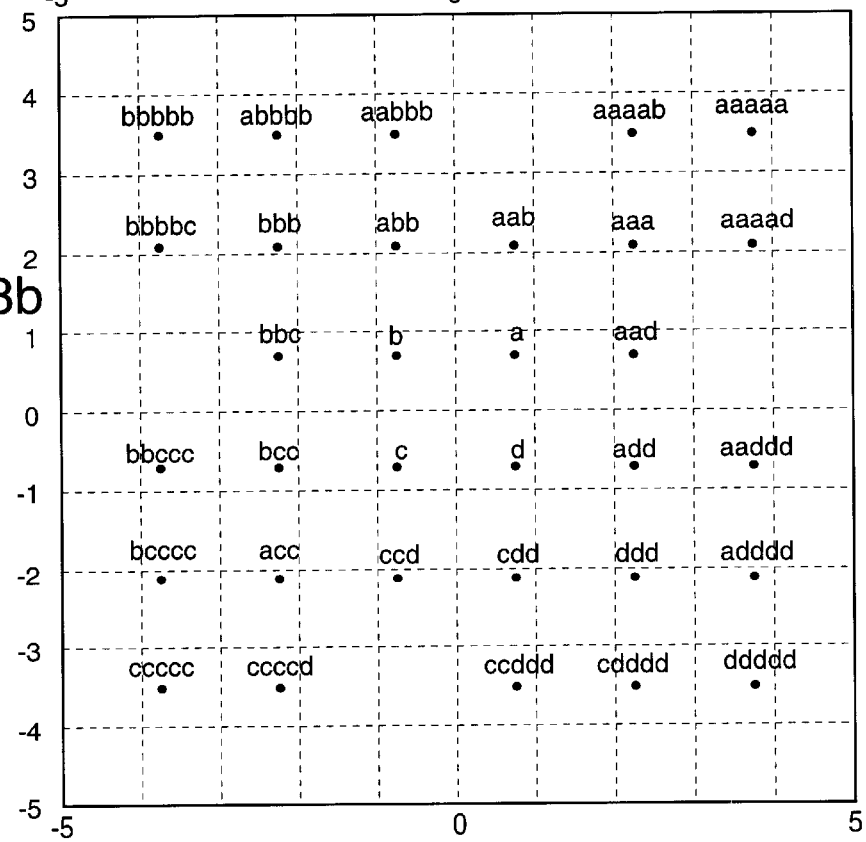
FIG. 8b illustrates a 32 QUAD pMAX constellation.

The dual strategies of minimizing the number of nearest neighbors and eliminating high power outer symbols are shown in FIGS. 7c and 7d, which show the 32 HEX qMAX and pMAX constellations. These were selected as the best of the 37 CHOOSE 5=435,897 subconstellations of the HHH qMAX and pMAX constellations. Similarly, the 32 QUAD constellations depicted in FIGS. 8a and 8b were obtained by examining 36 CHOOSE 4=58,905 subconstellations of the QQQQQ constellations.

Figure 8C:
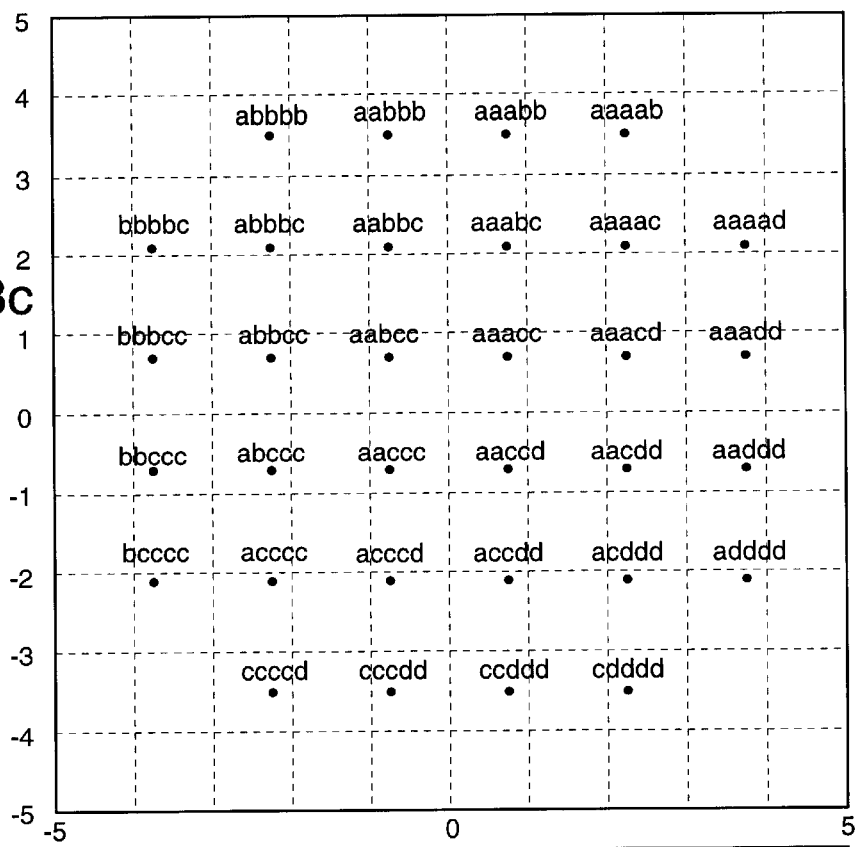
FIG. 8c illustrates a 32 CROSS qMAX constellation.
Figure 8D:
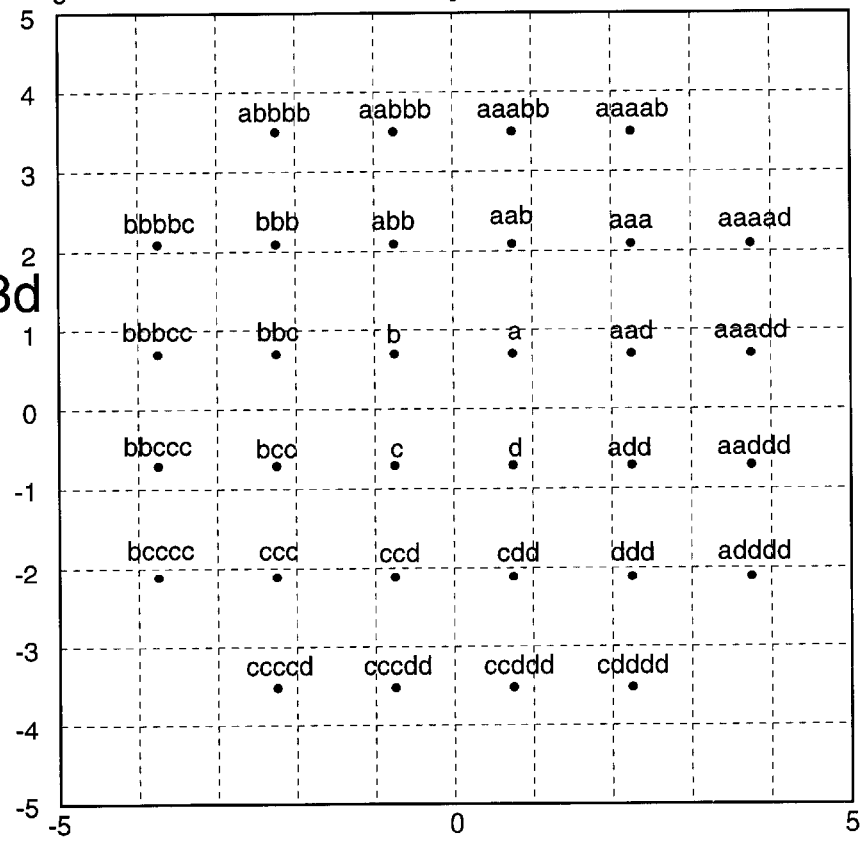
FIG. 8d illustrates a 32 CROSS pMAX constellation.
Figure 9A:
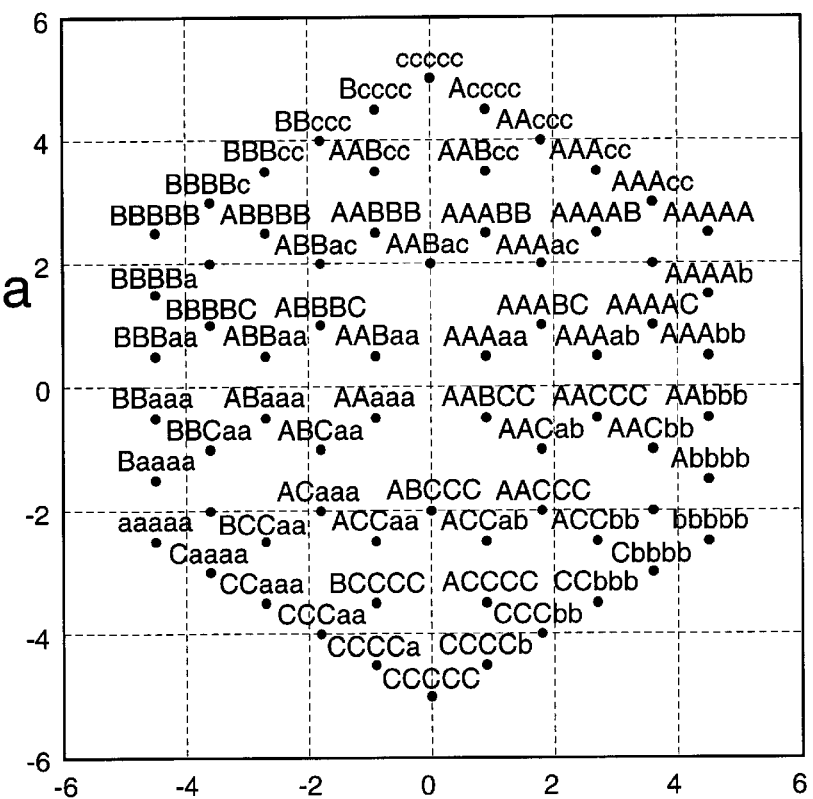
FIG. 9a illustrates a 64 HEX qMAX constellation.
Figure 9B:
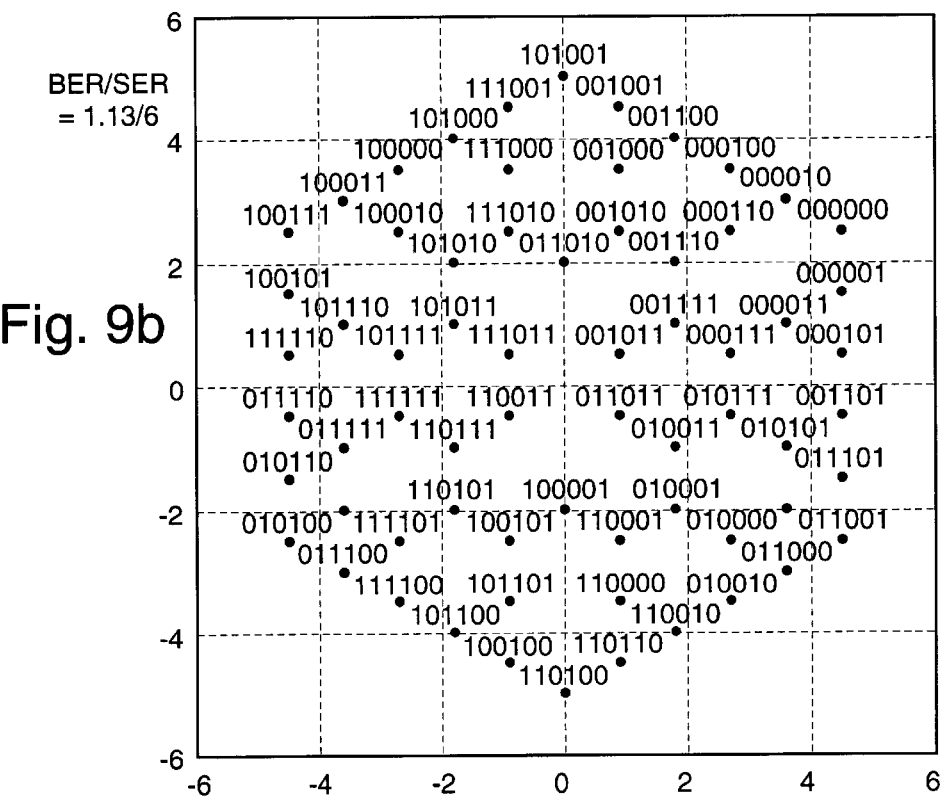
Figure 9C:
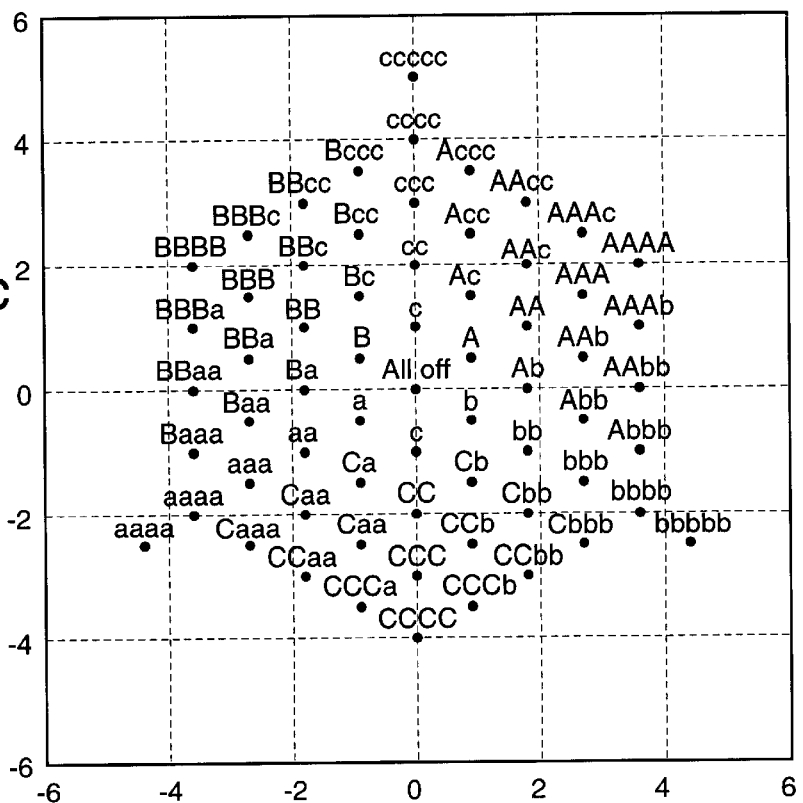
FIG. 9c illustrates a 64 HEX pMAX constellation.
Figure 9D:
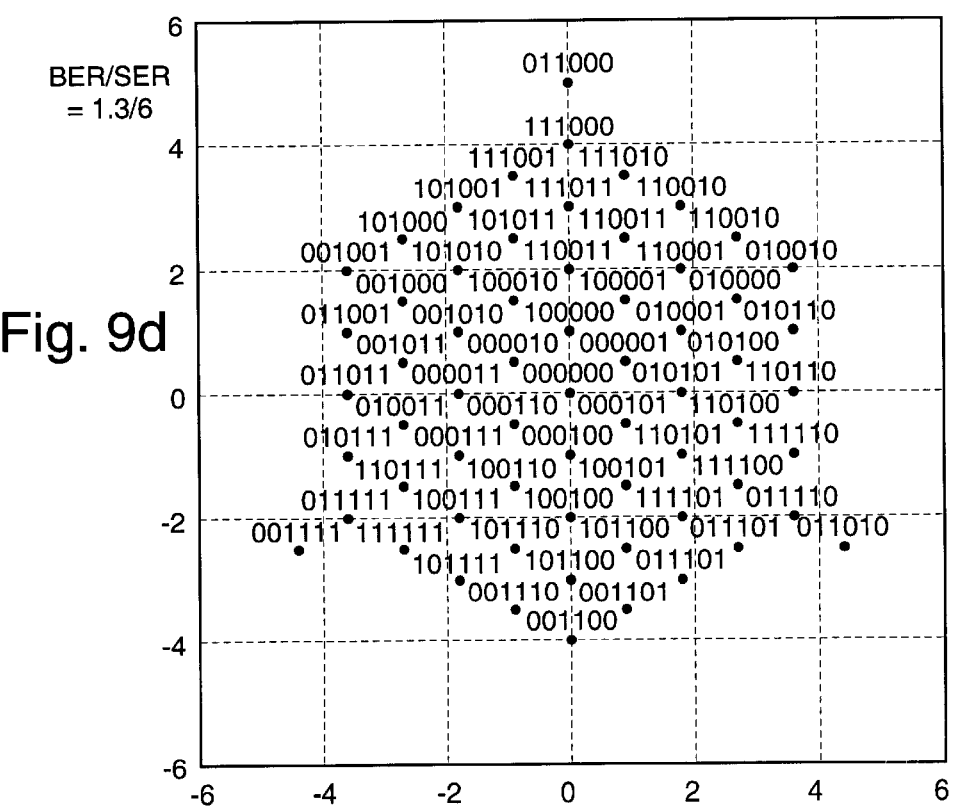
FIG. 9d illustrates coding for the 64 HEX pMAX constellation of FIG. 9c.

The 32 CROSS constellations in FIGS. 8c and 8d are included for comparison because they represent a more conventional configuration for a size 32 constellation (the 32 CROSS constellation is referred to as the "5-bit symmetric QASK array" in an article by J. G. Smith entitled "Odd-bit quadrature amplitude-shift keying", IEEE Trans. on communication, 23(3):385–389, March 1975. Eliminating the corner symbols makes sense when a single peak-power limited transmitter such as a TWTA is employed. However, when the present architecture is used, the results in discussed below confirm that the 32 CROSS constellations do not perform as well as the 32 QUAD constellations obtained through "strategic" pruning.

States and coding for the 64 HEX constellations are shown in FIG. 9. Because the HHHHH constellations from which they were derived have 91 CHOOSE 27≈9.78*10$^{22}$ subconstellations of size 64, pruning all 27 symbols in a single operation was not feasible. Instead, three symbols were pruned in each of nine consecutive operations.

While the 64 HEX constellations selected via this "multi-pruning" procedure would also be evaluated as part of "single operation" pruning, the converse would not necessarily hold for constellations selected via single operation pruning. Consequently, the SER achieved through multi-pruning must equal or exceed that achieved through single operation pruning.

An experiment with the QQQ pMAX constellation of FIG. 6b exemplifies this point, and also presents an interesting exception to the empirical rule that pMAX pruning removes outermost symbols. Multi-pruning this constellation, with three symbols pruned in each operation, eliminated all the outermost symbols except aaa, bbb, and ddd. However, if nine symbols are pruned in a single operation (requiring the evaluation of more than two million subconstellations), the 16 QAM pMAX constellation of FIG. 6c is obtained. This constellation is superior to the one obtained via multipruning. Assuming both constellations may be coded equally efficiently, the former would have a TPP of 11.99 dB and the latter a TPP factor of 12.29 at a BER of 0.001. Based on this result, an effective "first cut" at pruning pMAX constellations might be to disallow all symbols not occurring in the corresponding qMAX constellation. All pruned pMAX constellations disclosed herein (e.g., the 32 QUAD pMAX) have been generated according to this principle; in each case, multi-pruning without a prior first cut was also tested, but never provided any significant performance improvement.

Before beginning to prune, a question that must be answered is how large the initial, unpruned constellation should be, or equivalently, how many stages 12 should be employed. The size of the initial constellation must at least equal the desired constellation size. Experimental results suggest that using a few more than the minimum required number of stages 12 is generally disadvantageous in qMAX mode and unproductive in pMAX mode. A hypothetical explanation for this phenomenon in qMAX mode is that optimal constellations have approximately uniformly spaced symbols, and that realizing such spacing requires the initial constellation size to be close to an integer multiple of the desired size. As noted in the above-cited R. W. Lucky et al. article, a uniform distribution of symbols is optimal for a constellation with infinite size and a peak power limitation.

For pMAX, employing an additional stage 12 corresponds to adding a new, outer ring (if an H stage 12) or square (if a Q stage 12) of symbols to the unpruned constellation.

Because the pruning algorithm typically eliminates outermost symbols, the same pruned constellation may result regardless of how many stages 12 are employed. For both pMAX and qMAX, minimizing the number of stages 12 is desirable from the hardware standpoint: because each stage 12 (when on) introduces more distortion, the saturated output power and spurious phase shift of each stage 12 must be controlled more precisely as the number of stages 12 is increased.

Partial Gray coding will now be discussed. The Hanmming distance between the binary sequences corresponding to two different symbols must equal or exceed unity, as any code assigns distinct sequences to all the symbols. The term "Gray code" is applied to a code for which all nearest neighbor symbol pairs have sequences that satisfy the unity lower bound. For low SER, only errors involving nearest neighbors have significant probability, in which case equations (15) and (17) imply that a Gray code has $$\frac{BER}{SER} = \frac{1}{\log_2(N)}. \tag{19}$$

Some constellations are known to have Gray codes. Examples are the 16 QAM and 64 QAM constellations shown in FIG. 6. For other constellations such as the 16 HEX pMAX constellation of FIG. 7b, the goal is to find "partial" Gray codes for which the corresponding BER/SER approaches the Gray code bound in equation (19). Two ad hoc algorithms developed in accordance with this goal are discussed below. These are the "swapping algorithm" and the "tree-structured algorithm."

The swapping algorithm is conceptually straightforward. Initially, each symbol is arbitrarily assigned a distinct $\log_2(N)$ bit sequence, and the BER is calculated. Then, the N CHOOSE 2 symbol pairs $s_n$, $S_{n'}$ are arranged in a list. Starting with the first pair of the list, the effect on the BER of reassigning $c_n$ to $s_{n'}$ and $c_{n'}$ to $s_n$ is determined. If the BER would increase or remain the same, the "swap" is not effectuated and the algorithm proceeds iteratively to the next pair on the list, eventually terminating when the last pair on the list has been dismissed. However, if at some point in the list a pair is encountered for which swapping would reduce the BER, the swap is performed and the algorithm restarts with the first pair of the list.

A more general version of the algorithm permits a swap to involve more than two sequences. As an example of why such a generalization might be advantageous, it is possible that switching $c_1$ with $c_4$ and also switching $C_5$ with $c_6$ would reduce the BER but that performing either switch alone would not. Permutations in the switching order must sometimes be tested in the generalized algorithm; for example, note that the swap consisting of switching $c_1$ with $c_2$ and then $c_2$ with $c_3$ yields a different result than the swap in which $c_2$ is switched with $c_3$ and then $c_1$ with $c_2$.

Although the swapping algorithm is effective for 16-ary constellations, it is time-consuming for larger constellations. With a swap consisting of switching three sequences with three other sequences, the algorithm required about two days on a SPARCstation 5 to code the 64 HEX pMAX constellation of FIG. 9c to a BER/SER of 1.39/6. In essence, the algorithm is slow because it blindly examines all possible swaps of the specified complexity, rather than focusing attention on poorly coded sections of the constellation.

Figure 10:
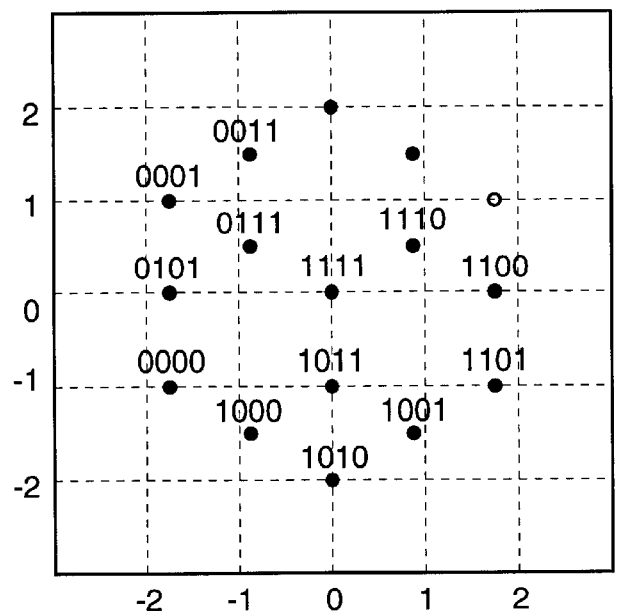

The "tree-structured algorithm" is a more effective approach to coding than the swapping algorithm; when applied to the 64 HEX pMAX constellation, it required less than twenty minutes to reach a BER/SER of 1.33/6. An intermediate point in the application of the tree-structured algorithm to the 16 HEX qMAX constellation is shown in FIG. 10. At this point in the algorithm, thirteen of the sixteen bit sequences have been assigned to symbols, so there are three sequences with which to code the circularly marked symbol, $s_O$. This symbol has two coded nearest neighbors, and the average Hamming distance between each of the available sequences and the nearest neighbors' sequences is indicated in FIG. 10.

Before execution of the algorithm, two parameters were defined: $l_H$, the local average Hamming distance bound, was set to 1.71, and $g_H$, the global average Hamming distance bound, was set to 1.35. From FIG. 10, two of the available sequences, 0100 and 0110, have average Hamming distances smaller than $l_H$. The third sequence, 0010, exceeds this bound and is therefore disallowed for $s_O$. Of the available sequences meeting the $l_H$ bound, the one with the smallest average Hamming distance (e.g., 0100 to arbitrarily resolve the tie) is tentatively assigned to the symbol, assuming that the resulting average Hamming distance over all coded nearest neighbors in the constellation does not exceed $g_H$. To remember that the sequence 0110 is also a possible code for $s_O$, this sequence is stored in a "tree branch" associated with $s_O$. After $s_O$ is coded, the algorithm checks all coded symbols in the order in which they were coded to find one with an uncoded nearest neighbor.

The algorithm then attempts to code this nearest neighbor in the previously described manner. If it were to prove impossible to satisfy the $l_H$ and $g_H$ bounds using any of the remaining unassigned sequences (0110 and 0010), the algorithm would return to the most recently coded symbol ($s_O$) and check for branches indicating other possible codes for the symbol. Should there be no branches, the algorithm would "back up" to an even earlier coded symbol. Otherwise, the code with the smallest average Hamming distance would be assigned to the symbol, and the corresponding branch would be lopped from the tree.

Although the algorithm can be terminated when all codes have been assigned, alternatively it can be forced to continue running in an attempt to find an improved solution. Values for $l_H$ and $g_H$ can be chosen by trial-and-error, or based on intuition and experience. A run with larger values entails more computation before algorithm termination, but necessarily outperforms (i.e., finds a better code) or matches a run with smaller values. It makes sense to set $l_H$ larger than $g_H$, because a good code may have significant variation in local average Hamming distance over the constellation. Also note that as long as $l_H$ and $g_H$ exceed 1.0, the algorithm is guaranteed to find a Gray code if one exists. In Table 1, the size column indicated the size before pruning.

The original pruning approach coded each subconstellation, then adjusted each source amplitude $\alpha_{so}$ that all the compared subconstellations would have the same specified BER, and finally selected the subconstellation with the smallest TPP factor. Although this approach was modified because of computational concerns, it became reasonable to implement when comparing a small number of constellations that had already been coded. In making this comparison, for which results are summarized in Table 1, a BER of 0.001 was specified. The bandwidth efficiency is computed assuming a channel bandwidth of 1.2 times the symbol rate and forward error correction block coding with a rate 0.9 code; units are bits/sec/Hz.

Keeping in mind that the best pruned constellation of a given size is of course the one with the smallest TPP factor, an examination of the Table 1 yields two salient observations. First, pMAX reduces the TPP by about one to three dB compared to qMAX. As one would expect, the primary reason for the reduction is that the AME is significantly higher for pMAX. Second, using H instead of Q stages 12 reduces the TPP by about one-half to one dB (a single exception is 64 QAM qMAX versus 64 HEX qMAX). That this reduction can also be attributed to the AME becomes evident if one notes for instance that $E_b/No_0$, which is proportional to the average load power, is actually lower for 16 QAM than for 16 HEX, but that the TPP is nevertheless lower for the latter. The reason that the AME is higher when H stages 12 are employed is that these stages 12 have more states than the Q stages 12 and therefore tend to add more coherently.

These separate benefits show that H stages 12 are preferable to Q stages 12 and that pMAX transmitters 10 are preferable to qMAX transmitters 10. The advantages are cumulative, so the best performance is achieved by using H stages 12 in pMAX mode. A further observation is that as the constellation size is increased to achieve higher bandwidth efficiency, the TPP and $E_b/N_0$, also increase for a given mode and type of stage 12. Indeed, fundamental principles indicate that increased bandwidth efficiency results from boosting the transmitter power by more than the proportionate increase in the data rate.

TABLE 1

| Name | FIG. | Stages | Mode | Size | BWE | BER/SER | $E_b/N_0$ (dB) | AME | TPP (dB) |
| --- | --- | --- | --- | --- | --- | --- | --- | --- | --- |
| 16 QAM | 6a | QQQ | qMAX | 16 | 3.00 | 1.00/4 | 10.53 | 0.56 | 13.08 |
| 16 QAM | 6c | QQQ | pMAX | 25 | 3.00 | 1.00/4 | 10.53 | 0.71 | 11.99 |
| 16 HEX | 7a | HH | qMAX | 19 | 3.00 | 1.21/4 | 11.20 | 0.70 | 12.73 |
| 16 HEX | 7b | HH | pMAX | 19 | 3.00 | 1.30/4 | 10.81 | 0.93 | 11.14 |
| 32 CROSS | 8c | QQQQQ | qMAX | 36 | 3.75 | 1.15/5 | 12.58 | 0.40 | 16.56 |
| 32 CROSS | 8d | QQQQQ | pMAX | 61 | 3.75 | 1.15/5 | 12.58 | 0.63 | 14.62 |
| 32 QUAD | 8a | QQQQQ | qMAX | 36 | 3.75 | 1.01/5 | 13.08 | 0.48 | 16.27 |
| 32 QUAD | 8b | QQQQ | pMAX | 61 | 3.75 | 1.08/5 | 13.05 | 0.72 | 14.49 |
| 32 HEX | 7c | HHH | qMAX | 37 | 3.75 | 1.25/5 | 13.10 | 0.60 | 15.31 |
| 32 HEX | 7d | HHH | pMAX | 37 | 3.75 | 1.30/5 | 12.67 | 0.88 | 13.22 |
| 64 QAM | — | QQQQQQQ | qMAX | 64 | 4.50 | 1.00/6 | 14.78 | 0.43 | 18.46 |
| 64 QAM | 6d | QQQQQQQ | pMAX | 113 | 4.50 | 1.00/6 | 14.78 | 0.68 | 16.47 |
| 64 HEX | 9a | HHHHH | qMAX | 91 | 4.50 | 1.13/6 | 15.94 | 0.56 | 18.45 |
| 64 HEX | 9c | HHHHH | pMAX | 91 | 4.50 | 1.33/6 | 14.72 | 0.87 | 15.34 |

Figure 11:
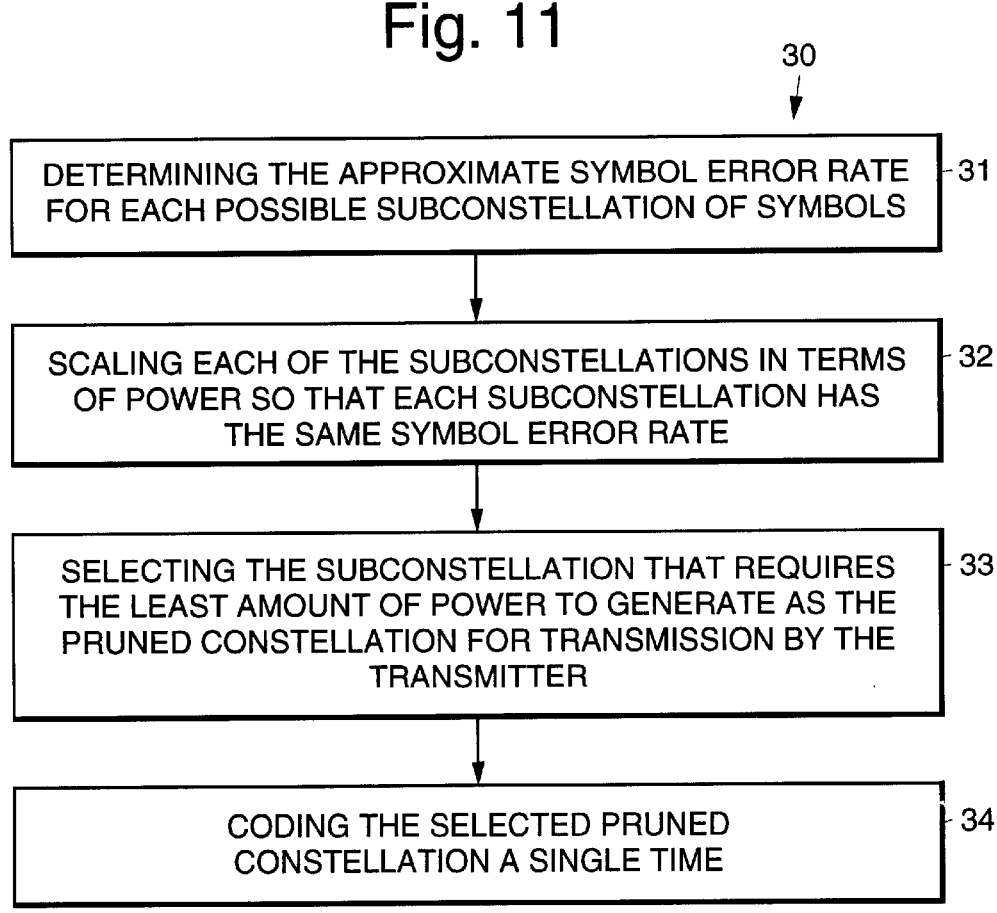
FIG. 11 is a flow diagram illustrating constellation pruning and partial Gray coding methods in accordance with the principles of the present invention.

For the purposes of completeness, FIG. 11 is a flow diagram illustrating a basic constellation pruning and partial Gray coding method 30 in accordance with the principles of the present invention. The method 30 comprises the following steps. The approximate symbol error rate for each possible subconstellation is determined 31. For example, if the constellation contains 19 constellation points and the constellation must be pruned to 16, then each possible subconstellation of 16 points is evaluated to determine its approximate symbol error rate. Then, each of the subconstellations are scaled 32 in terms of power so that each subconstellation has the same symbol error rate. Then, the subconstellation that requires the least amount of power to generate is selected 33 as the pruned constellation for use by the transmitter. After the pruned constellation is determined, it is then coded 34 a single time, and this coded pruned constellation is used by the transmitter. Thus, the present method thus codes 34 the selected pruned constellation by minimizing the number of bits of the code that are in error.

Details of the step of coding 34 the selected pruned constellation are as follows. (a) Sequences to constellation symbols are randomly assigned. (b) A bit error rate for the constellation is then computed taking into account only nearest neighbor errors. (c) A predetermined number of constellation sequences are then switched. (d) A new bit error rate for the constellation is computed taking into account only nearest neighbor errors. (e) If the new bit error rate is reduced from the previous one, then the new mapping of sequences to symbols is retained; Otherwise the mapping prior to the switch is retained. (f) All possible switches are tested and whenever a switch is accepted, then testing begins again. (g) All possible switches are tested until no switches are made. The predetermined number of constellation sequences that are simuntaneously switched may be two, three four, five, etc.

The step of coding 34 the selected pruned constellation may also be described as having the following steps. (a) A point of an uncoded constellation is selected. (b) The nearest neighbors of the selected point is found. (c) All possible sequences that can be used are evaluated, and an unused sequence from the available sequences that produces the best bit error rate is selected. (d) The remainder of the unused sequences is recorded. (e) The next nearest neighbors of the selected point are coded. (f) Steps (a) through (e) for each remaining point of the constellation are repeated.(g) If it is determined that the bit error rate is exceeded, indicating that a poor selection was made in step (c), the most recent decision is rejected and steps (c) through (e) are repeated until a code is selected that produces an acceptable bit error rate. (h) If it is determined in step (g) that none of the unused sequences produces an acceptable bit error rate, the next prior decision is rejected and steps (c) through (e) are repeated until a code is selected that produces an acceptable bit error rate. (i) Steps (a) through (h) are repeated for each remaining point of the constellation.

Thus, methods of pruning and coding constellation transmitted by a modulating array transmitter have been described. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A method of generating a pruned constellation of coded symbols for transmission by a transmitter, said method comprising the steps of:

determining the approximate symbol error rate for each possible subconstellation of symbols;

scaling each of the subconstellations in terms of power so that each subconstellation has the same symbol error rate;

selecting the subconstellation that requires the least amount of power to generate as the pruned constellation for transmission by the transmitter; and coding the selected pruned constellation a single time.

2. The method of claim 1 wherein the step of coding the selected pruned constellation comprises the step of minimizing the average number of bits of the code that are in error.

3. The method of claim 1 wherein the step of coding the selected pruned constellation comprises the steps of:

(a) randomly assigning sequences to constellation symbols;

(b) computing a bit error rate for the constellation taking into account only nearest neighbor errors;

(c) switching a predetermined number of constellation sequences;

(d) computing a new bit error rate for the constellation taking into account only nearest neighbor errors;

(e) if the new bit error rate is reduced from the previous one, then the mapping of sequences to symbols formed by switching the predetermined number of constellation sequences is retained; otherwise the mapping prior to the switch is retained;

(f) testing all possible switches and whenever a switch is accepted, then testing begins again; and (g) testing all possible switches until no switches are made.

4. The method of claim 3 wherein the predetermined number of constellation sequences that are switched is two.

5. The method of claim 3 wherein the predetermined number of constellation sequences that are switched is three.

6. The method of claim 3 wherein the predetermined number of constellation sequences that are switched is four.

7. The method of claim 3 wherein the predetermined number of constellation sequences that are switched is five.

8. The method of claim 1 wherein the step of coding the selected pruned constellation comprises the steps of:

(a) select a point of an uncoded constellation;

(b) find the nearest neighbors of the selected point;

(c) evaluate all possible sequences that can be used, and select an unused sequence from the available sequences that produces the best bit error rate;

(d) record the remainder of the unused sequences;

(e) code the next nearest neighbors of the selected point;

(f) repeat steps (a) through (e) for each remaining point of the constellation;

(g) if it is determined that the bit error rate is exceeded, indicating that a poor selection was made in step (c), reject the most recent decision and repeat steps (c) through (e) until a code is selected that produces an acceptable bit error rate;

(h) if it is determined in step (g) that none of the unused sequences produces an acceptable bit error rate, reject the next prior decision and repeat steps (c) through (e) until a code is selected that produces an acceptable bit error rate; and (i) repeat steps (a) through (h) for each remaining point of the constellation.

9. A method of generating a pruned constellation of coded symbols for transmission by a transmitter, said method comprising the steps of:

determining the approximate symbol error rate for each possible subconstellation of symbols;

scaling each of the subconstellations in terms of power so that each subconstellation has the same symbol error rate;

selecting the subconstellation that requires the least amount of power to generate as the pruned constellation for transmission by the transmitter, and coding the selected pruned constellation a single time by minimizing the average number of bits of the code that are in error.

10. The method of claim 9 wherein the step of coding the selected pruned constellation comprises the steps of:
(a) randomly assigning sequences to constellation symbols;
(b) computing a bit error rate for the constellation taking into account only nearest neighbor errors;
(c) switching a predetermined number of constellation sequences;
(d) computing a new bit error rate for the constellation taking into account only nearest neighbor errors;
(e) if the new bit error rate is reduced from the previous one, then the mapping of sequences to symbols formed by switching the predetermined number of constellation sequences is retained; otherwise the mapping prior to the switch is retained;
(f) testing all possible switches and whenever a switch is accepted, then testing begins again; and
(g) testing all possible switches until no switches are made.

11. The method of claim 10 wherein the predetermined number of constellation sequences that are switched is two.

12. The method of claim 10 wherein the predetermined number of constellation sequences that are switched is three.

13. The method of claim 10 wherein the predetermined number of constellation sequences that are switched is four.

14. The method of claim 10 wherein the predetermined number of constellation sequences that are switched is five.

15. The method of claim 9 wherein the step of coding the selected pruned constellation comprises the steps of:
(a) select a point of an uncoded constellation;
(b) find the nearest neighbors of the selected point;
(c) evaluate all possible sequences that can be used, and select an unused sequence from the available sequences that produces the best bit error rate;
(d) record the remainder of the unused sequences;
(e) code the next nearest neighbors of the selected point;
(f) repeat steps (a) through (e) for each remaining point of the constellation;
(g) if it is determined that the bit error rate is exceeded, indicating that a poor selection was made in step (c), reject the most recent decision and repeat steps (c) through (e) until a code is selected that produces an acceptable bit error rate;
(h) if it is determined in step (g) that none of the unused sequences produces an acceptable bit error rate, reject the next prior decision and repeat steps (c) through (e) until a code is selected that produces an acceptable bit error rate; and
(i) repeat steps (a) through (h) for each remaining point of the constellation.

* * * * *